Patented Apr. 2, 1935

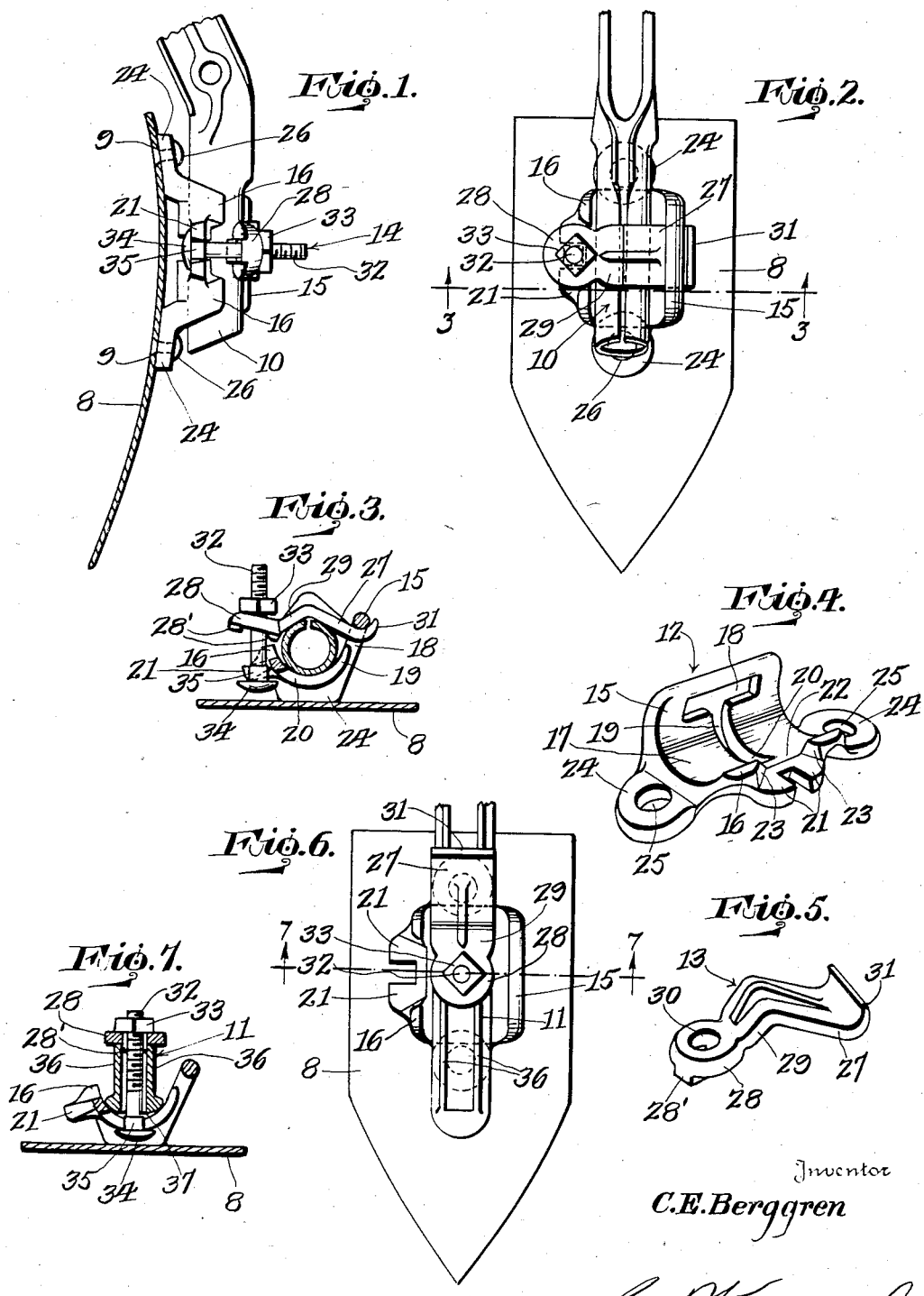

1,996,666

UNITED STATES PATENT OFFICE 1,996,666

CULTIVATOR SHOVEL BACK

Charls E. Berggren, Wilcox, Nebr.

Application May 8, 1934, Serial No. 724,562

3 Claims. (Cl. 97—198)

This invention relates to a cultivator shovel back and has for its object to provide, in a manner as hereinafter set forth, a structure capable of being employed for securing with the shovel a shank having its cross sectional contour square, polygonal, circular or oval.

A further object of the invention is to provide a cultivator shovel back capable of being universally employed in connection with the various forms of cultivator shovel shanks now in general use.

Further objects of the invention are to provide, in a manner as hereinafter set forth, a cultivator shovel back which is simple in its construction and arrangement, strong, durable, compact, capable of being used in connection with shovel shanks of various forms, thoroughly efficient for the purpose intended thereby, conveniently applied when coupling or anchoring a shank with a shovel, and inexpensive to manufacture.

To the above ends essentially, and to others which may hereinafter appear, the invention consists of such parts, and such combination of parts which fall within the scope of the invention as claimed.

In the drawing:

Figure 1 is a longitudinal sectional view of a cultivator shovel having installed therewith a back in accordance with this invention and further illustrating a shank of circular section secured to the shovel, Figure 2 is a rear elevation of the back carried by a cultivator shovel and further illustrating a shank of circular cross section secured in position with respect to the shovel, Figure 3 is a section on line 3—3, Figure 2, Figure 4 is a perspective view of the holder element of the back, Figure 5 is a perspective view of the clamping element of the back, Figure 6 is an elevation of a cultivator shovel showing the adaptation therewith of the back, in accordance with this invention securing in position a shank of square cross section, Figure 7 is a section on line 7—7, Figure 6.

In the drawing a cultivator shovel is designated 8 and it is formed at its lengthwise median with a pair of spaced aligning openings 9. A cultivator shank of circular cross section is designated 10 and one of square cross section at 11.

The shovel back or shank coupling structure, in accordance with this invention comprising a holding element 12, a clamping element 13 and a securing unit 14.

The element 12 is formed of a single casting and consists of a pair of oppositely inclined sides 15, 16 and a concave bottom 17. The side 15 is of greater height than side 16 and is formed with a T-shaped slot. The head and stem of the latter are indicated at 18, 19 respectively. The stem 18 is disposed at the vertical center and the head 19 between the longitudinal center and the top edge of side 15. The bottom 17 is formed at its transverse center with a slot 20 forming a continuation of the stem 19 and which is of a length to extend into the lower portion of side 16. Extending downwardly at an inclination from the outer face of side 16 below the top edge of the latter is a pair of spaced parallel lugs 21 which provide element 12 with what may be termed a slotted portion on side 16. The side 16 centrally thereof is formed with a transverse groove 22 opening at its top edge. The side walls 23 of groove 22 are oppositely inclined. The bottom wall of groove 22 forms a continuation of the upper faces of lugs 21. Formed integral with the lower face of the bottom 17 at the ends of the latter are oppositely directed downwardly inclined ears 24 formed with the openings 25.

The ears 24 are of angle-shaped contour and each is formed with a vertical and a horizontal leg. The latter is of less length than and extends rearwardly from the inner end of the vertical leg with respect to the rear face of shovel 8. The horizontal leg merges into one end of the inner face of the bottom 17.

The holding element 12 is adapted to be positioned rearwardly of and have the vertical legs of the ears 24 abut against the rear face of the shovel 8, and with the apertures 25 registering with the openings 9. Holdfast means 26 extend through said registering openings for anchoring element 12 to shovel 8, and when so anchored the bottom 17 will be spaced throughout from the rear face of the shovel. This arrangement is had due to the forwardly extending of the ears 24 with respect to bottom 17.

The clamping element 13 consists of a narrow body part of substantially oblong contour in plan formed with a pair of end stretches 27, 28 and an intermediate stretch 29 of greater length than either end stretch. The stretch 27 is of concave form and has its outer portion extended above its inner portion to provide a bill 31. The stretch 28 is of circular form provided on its inner face with a pair of spaced lugs 28' disposed diametrically thereof. The stretch 28 is also formed with an axially arranged opening 30. The stretch 29 is of substantially inverted V-form and provided on its outer face with a re-inforcing rib. The stretch 27 constitutes a hook.

The securing unit 14 consists of a headed bolt 32 and a retainer nut 33 adjustably mounted on its shank. The head of the bolt is designated 34. The bolt 32 has its shank formed with a squared portion 35 adjacent head 34.

When securing the shank 10 to the shovel 8 it is positioned against the upper face of bottom 17 between the sides 15, 16. The bolt 32 is extended upwardly between the lugs 21. The head 34 of the bolt abuts the lower face of the lugs 21 and is of a diameter greater than the space between said lugs 24. The element 13 is then positioned upon shank 10, with the hook formed by end stretch 27 extended through the head 19 of the T-shaped slot and with end stretch 28 mounted on the shank of bolt 32. This arrangement couples the shank 10 with element 12. Now to fixedly secure shank 10 to element 12, the nut 33 is positioned on the shank of bolt 32 to abut end stretch 28 of element 13. The nut 33 is then adjusted to set up a binding engagement between elements 12, 13 and shank 10 whereby the latter is tightly secured with element 12.

The shank 11 includes two spaced sections 36 and an opening 37 for the passage of bolt 32. When securing shank 11 to shovel 8 it is positioned against the upper face of bottom 17 between the sides 15, 16. The opening 37 in shank 11 registers with slot 20. Bolt 32 is extended up through slot 20, opening 37 and shank sections 36. The head 35 of bolt 32 abuts the lower face of bottom 17 and is of greater diameter than the width of slot 20. The element 13 is then positioned on the outer edges of the sections 36 of the shank 11 and with the stretch 28 of element 13 having the shank of bolt 32 extending therethrough and thereabove. This arrangement couples shank 11 with element 12. To fixedly secure shank 11 to element 12, the nut 33 is positioned on the shank of bolt 32 to abut end stretch 27. The nut is then adjusted to set up a binding action between elements 12, 13 and shank 11 whereby the latter is tightly secured with element 12. The lugs 28' depend between the sections 36 of the shank 11 to prevent the element 13 from shifting.

What I claim is:

1. A cultivator shovel back for anchoring a shank to the shovel comprising a holding element formed of a concave bottom part, a pair of upstanding side parts, one of the side parts being of less height than the other and cut away centrally thereof, a pair of laterally extending apertured ears at and inset with respect to the ends of said bottom part to space the latter from the shovel and a pair of inwardly inclined spaced parallel lugs integral at the point of mergence of said bottom part with the side part of less height, said element being formed transversely thereof with a T-shaped slot, the stem of the latter being arranged in said bottom part and the side part of greatest height, the head of said slot being positioned in said side part of greatest height, holdfast means for extension through said ears for anchoring the latter against the shovel, a securing unit for abutting spaced portions of and for extension outwardly through said holding element, and a clamping element for seating upon the shank and having an opening at one end for the passage of the securing unit, the latter including an adjustable part for bearing against said apertured end.

2. A cultivator shovel back for anchoring a shank to the shovel comprising a holding element formed of a concave bottom and a pair of sides of different height, said element having a pair of oppositely disposed apertured ears of angle-shape contour extending forwardly from the ends of said bottom adapted to abut and be anchored to said rear face for maintaining the shovel in spaced relation with respect to said bottom, said element being formed with a T-shaped slot having its stem portion extending from the side of smallest height, transversely through said bottom and into said other side, the head portion of said opening being arranged within the said other side lengthwise of the latter, said side of smallest height cut out in its top edge and formed with a slotted portion spaced from and aligning with the closed end of said stem portion, a shank clamping element having a hooked-shaped part, an inverted V-shaped part for seating on the shank and an apertured part, and a securing unit having a squared part for selectively positioning in said slotted portion and said stem portion, said securing unit including a part for extension through said apertured part and an adjustable part for binding upon said apertured part.

3. A cultivator shovel back for anchoring a shank to the shovel comprising a holding element formed of a concave bottom and a pair of sides of different height, said element having a pair of oppositely disposed apertured ears of angle-shaped contour extending forwardly from the ends of said bottom adapted to abut and be anchored to said rear face for maintaining the shovel in spaced relation with respect to said bottom, said element being formed with a T-shaped slot having its stem portion extending from the side of smallest height, transversely through said bottom and into said other side, the head portion of said opening being arranged within the said other side lengthwise of the latter, a shank clamping element having concave and inverted V-shaped parts for seating on the shank and an apertured part extended laterally from said V-shaped part, and a securing unit including a part for abutting the lower face of said bottom, a squared part for extension through said stem portion, a threaded part for extension through the shank and said apertured part and an adjustable part engaging with said threaded part and for binding upon said apertured part, and said apertured part having its inner face formed with spaced lugs diametrically thereof for extension into the shank.

CHARLS E. BERGGREN.